US010084929B2

(12) United States Patent
Kainuma

(10) Patent No.: US 10,084,929 B2
(45) Date of Patent: Sep. 25, 2018

(54) OPERATION PANEL AND IMAGE FORMING APPARATUS THEREWITH

(71) Applicant: KYOCERA Document Solutions Inc., Osaka (JP)

(72) Inventor: Takashi Kainuma, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 10 days.

(21) Appl. No.: 15/609,486

(22) Filed: May 31, 2017

(65) Prior Publication Data

US 2017/0353617 A1    Dec. 7, 2017

(30) Foreign Application Priority Data

Jun. 7, 2016  (JP) ................................. 2016-113237

(51) Int. Cl.
*H04N 1/00* (2006.01)
(52) U.S. Cl.
CPC ....... *H04N 1/00496* (2013.01); *H04N 1/0049* (2013.01); *H04N 1/00384* (2013.01); *H04N 1/00411* (2013.01); *H04N 1/00424* (2013.01); *H04N 2201/0094* (2013.01)
(58) Field of Classification Search
CPC ........... H04N 1/00496; H04N 1/00384; H04N 1/0049
See application file for complete search history.

(56) References Cited

U.S. PATENT DOCUMENTS

| 5,610,797 | A | * | 3/1997 | Nakamura | ......... | H04N 1/00352 |
| | | | | | | 358/400 |
| 2011/0242612 | A1 | * | 10/2011 | Tsubakimoto | ..... | H04N 1/00204 |
| | | | | | | 358/442 |
| 2012/0320599 | A1 | * | 12/2012 | Tanaka | ............... | H04N 1/02835 |
| | | | | | | 362/296.01 |
| 2014/0029050 | A1 | * | 1/2014 | Chen | ...................... | G06K 15/40 |
| | | | | | | 358/1.15 |
| 2015/0242026 | A1 | * | 8/2015 | Nakamura | ......... | H04N 1/00384 |
| | | | | | | 345/174 |
| 2016/0114647 | A1 | * | 4/2016 | Han | ...................... | B60H 1/0065 |
| | | | | | | 349/193 |

FOREIGN PATENT DOCUMENTS

JP    2012-10137 A    1/2012

* cited by examiner

*Primary Examiner* — Benjamin O Dulaney
(74) *Attorney, Agent, or Firm* — Stein IP, LLC

(57) ABSTRACT

An operation panel used in an image forming apparatus has a panel face, a semi-transparent member of a black or similar color, and a light source. The panel face has an operation region. The semi-transparent member is arranged such that its top face is approximately flush with the panel face at least along a peripheral part of it. The light source is arranged under the semi-transparent member in the peripheral part of the panel face.

5 Claims, 4 Drawing Sheets

OPERATION PANEL AND IMAGE FORMING APPARATUS THEREWITH

INCORPORATION BY REFERENCE

This application is based upon and claims the benefit of priority from the corresponding Japanese Patent Application No. 2016-113237 filed on Jun. 7, 2016, the entire contents of which are incorporated herein by reference.

BACKGROUND

The present disclosure relates to an operation panel that includes a panel face having an operation region and a light source arranged in a peripheral part of the panel face, and to an image forming apparatus provided with such an operation panel.

Conventionally, image forming apparatuses such as copiers, printers, and facsimile machines are provided with an operation panel to allow the user to make various settings. By operating a plurality of operation keys provided on the panel face of the operation panel, the user enters the number of copies to be made, the magnification, a command to start printing, and the like.

There are known operation panels that are provided with a plurality of light sources such as LEDs to visually indicate apparatus status to the user. For example, an operation panel is covered with an opaque resin cover to prevent leakage of light to the outside. In the parts of the opaque resin cover opposite the light sources for indicating apparatus state to the user, openings are formed, in which semi-transparent members of a white or similar color are arranged. Thus, when the light sources are lighted, the light from them is emitted through the semi-transparent members to outside the operation panel, thereby indicating apparatus status to the user.

SUMMARY

According to one aspect of the present disclosure, an operation panel is for use in an image forming apparatus. The operation panel includes a panel face, a semi-transparent member of a black or similar color, and a light source. The panel face includes an operation region. The semi-transparent member is arranged such that its top face is approximately flush with the panel face at least along a peripheral part of it. The light source arranged under the semi-transparent member in the peripheral part of the panel face.

Further features and advantages of the present disclosure will become apparent from the description of embodiments given below.

DETAILED DESCRIPTION

An embodiment of the present disclosure will be described below with reference to the accompanying drawings.

Figure 1:
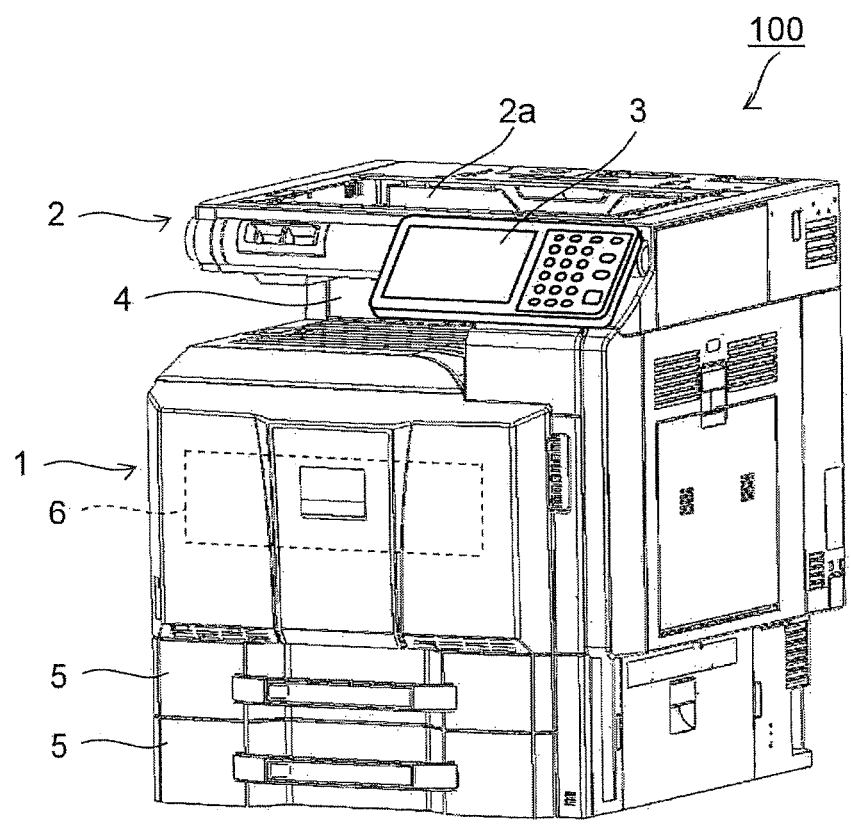
FIG. 1 is a perspective view showing the structure of an image forming apparatus provided with an operation panel according to one embodiment of the present disclosure.

With reference to FIGS. 1 to 7, an image forming apparatus 100 provided with an operation panel 3 according to one embodiment of the present disclosure will be described. As shown in FIG. 1, the image forming apparatus 100 (here, a digital multifunction peripheral is taken as an example) has an apparatus body 1 and an image reading section 2 arranged over it.

In the image reading section 2, a reading section for reading image information from a document on a contact glass 2a is provided. The reading section is composed of a scanning optical system including a scanner lamp and a mirror, a converging lens for converging and focusing the light reflected from the document, a CCD sensor for converting the focused image light into an electrical signal, and the like (none is illustrated), and reads a document image to convert it into image data.

In a front part of the image reading section 2, an operation panel 3 having a display and operation keys is provided. Over the image reading section 2, a platen (unillustrated) for pressing a document placed on the contact glass 2a is provided in an openable-closable manner.

Between the image reading section 2 and the apparatus body 1, an in-body sheet discharge space 4 that is wide open toward the left side and front faces is provided.

In a front part of the apparatus body 1, a plurality of (here, two) sheet feed cassettes 5 for storing sheets (recording medium) are provided in an attachable-detachable manner relative to the apparatus body 1.

Inside the apparatus body 1, there are provided an image forming section 6, a fixing section, a sheet conveying section (none is illustrated), and the like. According to image data read by the image reading section 2, the image forming section 6 transfers a toner image to a sheet fed to it, thereby to form an image. The image forming section 6 includes a photosensitive drum for carrying an electrostatic latent image, a charging unit for electrostatically charting the surface of the photosensitive drum, an exposure unit for forming an electrostatic latent image corresponding to a document image on the surface of the photosensitive drum by use of a laser beam or the like, a developing unit for forming a toner image by adhering developer to the so formed electrostatic latent image, a transfer roller for transferring the toner image to a sheet, a cleaning blade for removing the toner left behind on the surface of the photosensitive drum, and the like. The fixing section heats and presses the sheet having the toner image transferred to it to fix the toner image to the sheet. The sheet conveying section extends upward along the right side face of the apparatus body 1, and conveys sheets from a sheet feed cassette 5 to the image forming section 6.

Next, the structure of the operation panel 3 will be described.

Figure 2:
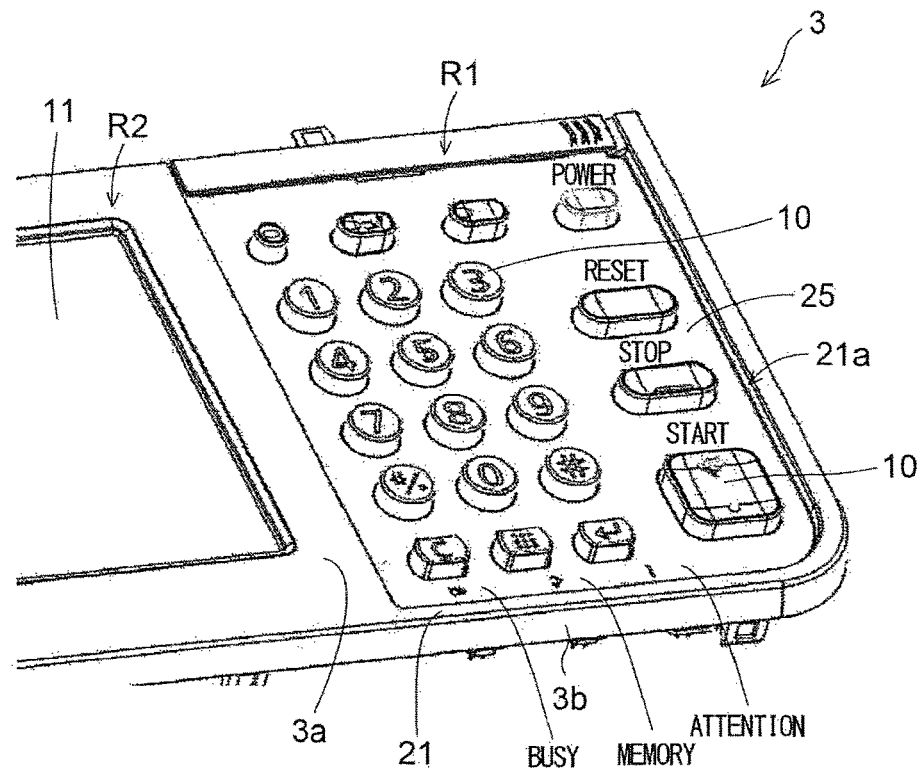
FIG. 2 is a perspective view showing, with a bottom cover member removed, the structure of the operation panel according to the one embodiment of the present disclosure.
Figure 3:
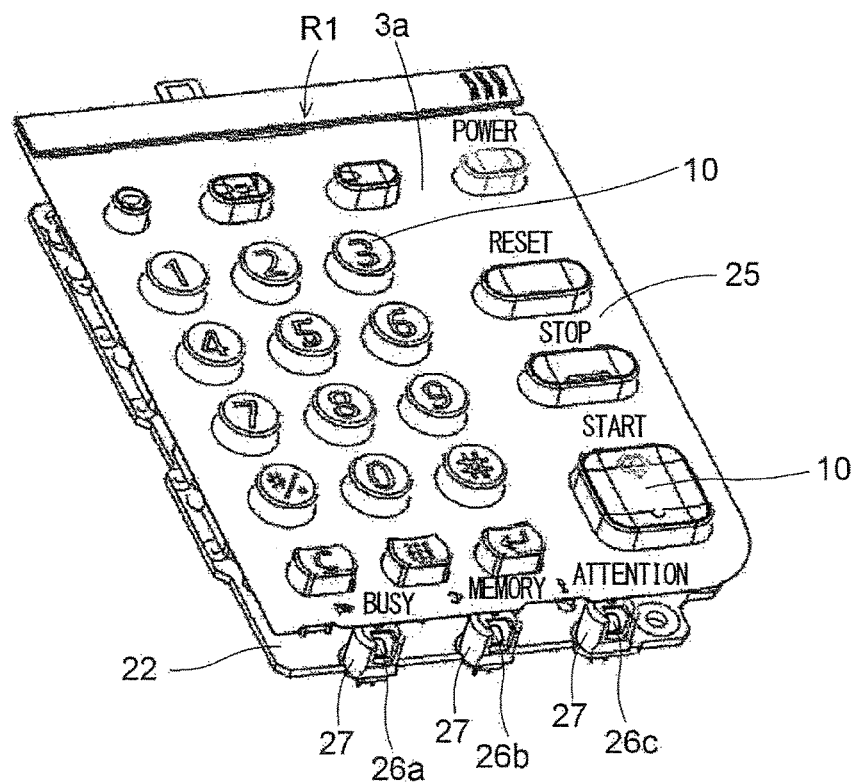
FIG. 3 is a perspective view showing, with a top cover member and the bottom cover member removed, the structure around operation keys on the operation panel according to the one embodiment of the present disclosure.

As shown in FIG. 2, the operation panel 3 has a panel face 3a (the top face of the operation panel 3) on which a plurality of operation keys 10 and a display panel 11 are arranged, a side face 3b which extends downward from a peripheral part of the panel face 3a, and a bottom face which is arranged opposite the panel face 3a.

In an operation region R1 (a right-hand region in FIG. 2) of the panel face 3a, a plurality of operation keys 10 which are pressed (operated) by the user are provided to protrude upward from the panel face 3a. The operation keys 10 includes numerical keys, which are for accepting input of values and the like by the user, a POWER key, a RESET key, a STOP key, a START key, and the like.

In a display region R2 (a left-hand region in FIG. 2) of the panel face 3a, a display panel 11 comprising a liquid crystal display panel is arranged. The display panel 11 may include, on its display surface side (top side), a touch screen which the user touches for input operations. The display panel 11 displays information on image forming operation, icon images (operation keys) for operations on the touch screen, and the like.

The operation panel 3 includes a top cover member (semi-transparent member) 21 made of semi-transparent resin in which through-holes are formed at positions corresponding to the plurality of operation keys 10 and in which an opening is formed at a position corresponding to the image display region of the display panel 11, a circuit board 22 (see FIG. 3) on which switches (unillustrated) are provided which are pressed when the operation keys 10 are depressed, and a bottom cover member 23 (see FIG. 4) made of opaque resin which covers a bottom part of the operation panel 3. The top cover member 21 forms the panel face 3a and (a top-side) part of the side face 3b, and the bottom cover member 23 forms (a bottom-side) part of the side face 3b and the bottom face.

Figure 4:
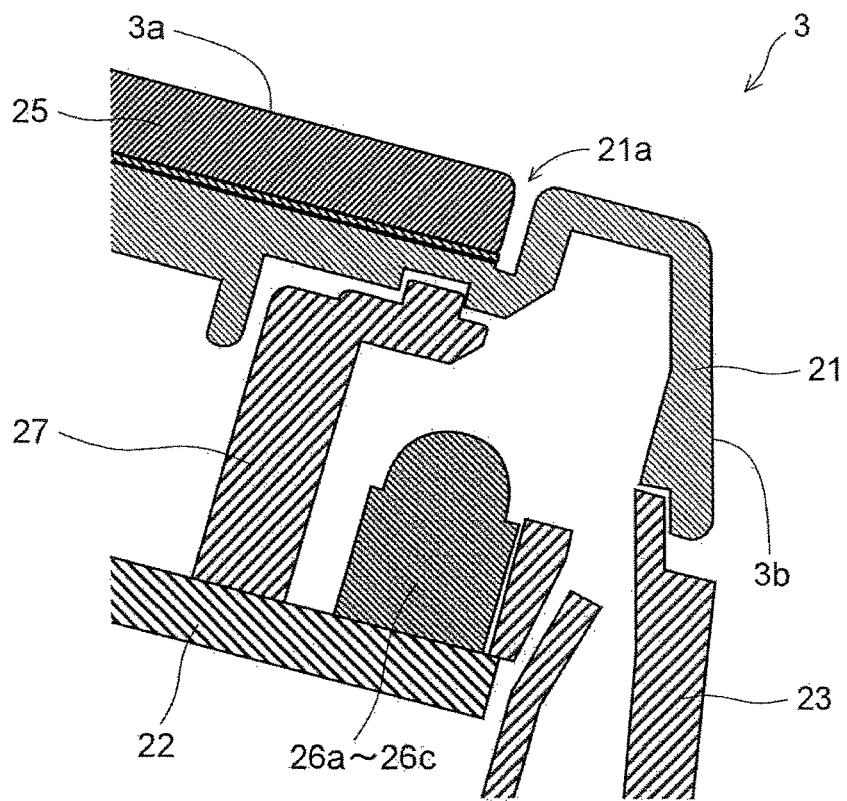
FIG. 4 is a sectional view showing the structure around a light source in the operation panel according to the one embodiment of the present disclosure.

As shown in FIGS. 2 and 4, in a predetermined region (a region corresponding to the operation region R1) of the top face of the top cover member 21, a recess 21a is formed. In this recess 21a, an operation portion cover 25 made of opaque resin in which through-holes are formed at positions corresponding to the plurality of operation keys 10 is arranged. The operation portion cover 25 is marked, at positions corresponding to the operation keys 10, with characters and symbols such as "POWER," "RESET," "STOP," "START," and the like, and the operation portion cover 25 is marked, in a peripheral part of it, with characters such as "BUSY," "MEMORY," "ATTENTION," and the like along with corresponding symbols.

Figure 5:
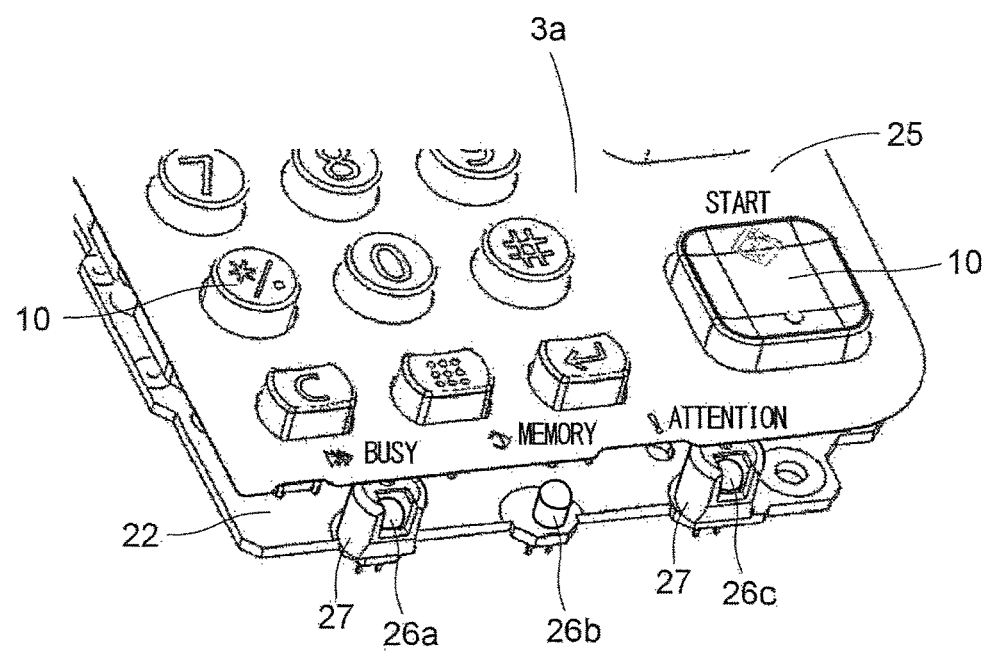
FIG. 5 is a perspective view showing, with the top and bottom cover members removed, the structure around light sources in the operation panel according to the one embodiment of the present disclosure.
Figure 6:
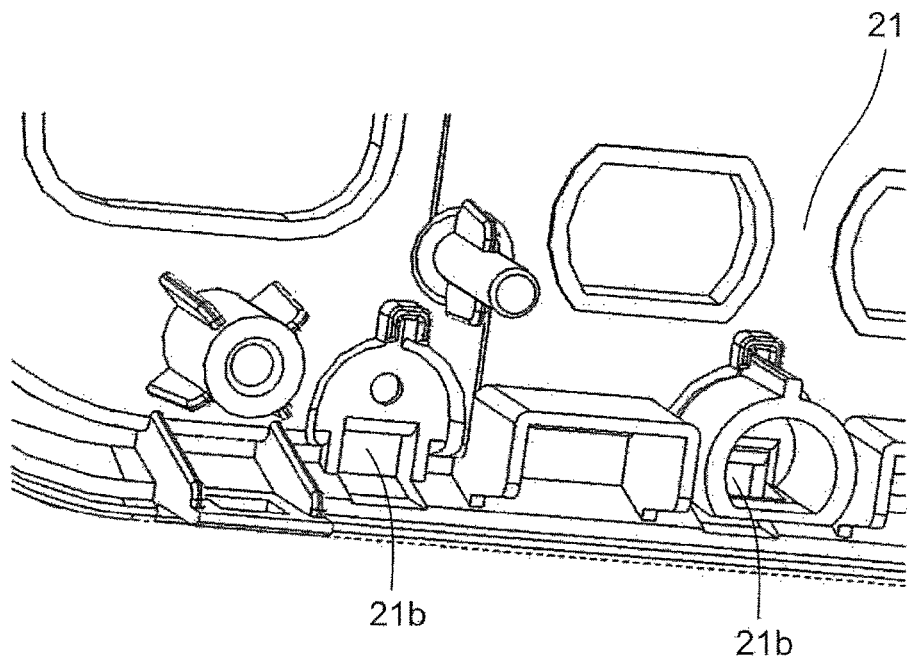
FIG. 6 is a perspective view showing, from below, the structure of the top cover member according to the one embodiment of the present disclosure.

Under a peripheral part of the top cover member 21, a plurality of (here, three) light sources 26a to 26c (see FIGS. 3 and 4) are arranged. As shown in FIG. 5, the light sources 26a to 26c are fitted at predetermined positions (near the markings "BUSY," "MEMORY," and "ATTENTION," on the operation portion cover 25) in the peripheral part of the circuit board 22. When lighted, the light sources 26a to 26c indicate the apparatus status to the user. For example, the light source 26a corresponding to "BUSY" indicates to the user that print operation is in progress, the light source 26b corresponding to "MEMORY" indicates to the user that printing cannot be performed due to lack of memory, and the light source 26c corresponding to "ATTENTION" indicates to the user that an apparatus error such as a sheet jam or a communication error has occurred. In FIG. 5, a reflective member 27, which will be described later, corresponding to the light source 26b is omitted from illustration.

On the circuit board 22, near the light sources 26a to 26c, reflective members 27 are respectively fitted. The reflective members 27 are arranged so as to enclose the light sources 26a to 26c in the left and right directions in FIG. 3, in the left direction in FIG. 4 (the direction toward the inside of the operation panel 3), and in the leftward and obliquely upward direction in FIG. 4 (the direction toward the operation portion cover 25). Thus, the light emitted from the light sources 26a to 26c is emitted, either directly or after being reflected on the reflective members 27, toward the top and front faces of the operation panel 3.

The top cover member 21 is formed of semi-transparent resin of a black or similar color (black, dark gray, dark blue, or the like) and the light emitted from the light sources 26a to 26c can pass through it. The light transmittance of the top cover member 21 is higher than that of the operation portion cover 25 and the bottom cover member 23 but lower than that of semi-transparent resin of a white color.

As shown in FIG. 2, the top cover member 21 is formed such that its top face is approximately flush with the panel face 3a at least along a peripheral part of it. In other words, the top cover member 21 has its top face formed as a continuous flat face with no step or groove at least along a peripheral part of the panel face 3a. Moreover, as shown in FIG. 4, the top cover member 21 is formed to lie continuously over the panel face 3a to the side face 3b.

Figure 7:
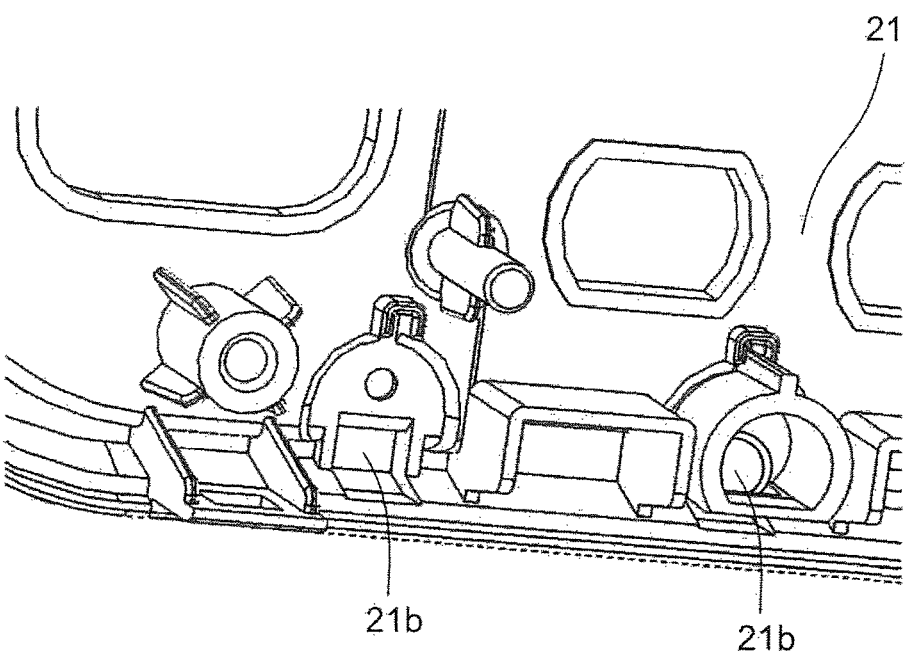
FIG. 7 is a perspective view showing, from below, the structure of a top cover member in a modified example of the present disclosure.

Opposite parts 21b (see FIG. 6) of the top cover member 21 opposite which the light sources 26a to 26c are respectively arranged are formed with a thickness smaller than that of the other part of the top cover member 21. The opposite parts 21b are given a thickness smaller than that of the other part of the top cover member 21 as a result of the inner face of the top cover member 21 being formed in a recessed shape. As shown in FIG. 7, the opposite parts 21b may be formed in mutually different shapes such as rectangular, circular (or triangular), and other shapes.

Moreover, on the outer face of at least a peripheral part of the top cover member 21, fine grains are formed by a surface graining process.

In the embodiment, as described above, under the top cover member 21 which is made of semi-transparent resin of a black or similar color, the light sources 26a to 26c are provided. Thus, the light emitted from the light sources 26a to 26c is emitted through the top cover member 21 to outside the operation panel 3; thus, even when the image forming apparatus 100 is installed, for example, in a well-lighted space as in an office, the light emitted from the light sources 26a to 26c is unlikely to be difficult to see. This helps enhance the visibility of the light emitted from the light sources 26a to 26c.

Moreover, owing to the top cover member 21 being provided such that its top face is approximately flush with the panel face 3a at least along a peripheral part of it, when a person with impaired vision operates the operation panel 3, he is unlikely to erroneously recognize the parts of the top cover member 21 opposite the light sources 26a to 26c as operation keys 10; this helps enhance the user-friendliness for people with impaired vision.

Moreover, as described above, the top cover member 21 is formed to lie continuously over the panel face 3a to the side face 3b. Thus, light can be emitted also through the side face 3b of the operation panel 3; thus, even a user in a low position or at a location away from the image forming apparatus 100 can easily recognize the light emitted from the light sources 26a to 26c.

Moreover, as described above, the opposite parts 21b of the top cover member 21 opposite which the light sources 26a to 26c are arranged may be formed in mutually different shapes and in addition with a thickness smaller than that of the other part of the top cover member 21. With this structure, the apparatus state can be recognized easily by the shape of the region (opposite parts 21b) of the top cover member 21 that is being lighted.

Moreover, as described above, the opposite parts 21b are given a thickness smaller than that of the other part of the top cover member 21 as a result of the inner face of the top cover member 21 being formed in a recessed shape. Thus, as compared with a case where the outer face of the top cover member 21 is formed in a recessed shape, a person with impaired vision operating the operation panel 3 is unlikely to erroneously recognize the top cover member 21 as operation keys 10.

Moreover, as described above, the outer face of the top cover member 21 is grained by a surface graining process. Thus, light can be diffused at the outer face of the top cover member 21; this permits uniform light to be emitted from the top cover member 21.

Moreover, as described above, near the light sources 26a to 26c, the reflective members 27 are provided which reflect the light from the light sources 26a to 26c in a predetermined direction. Thus, the light traveling toward the inside of the operation panel 3 can be emitted toward the front face of the image forming apparatus 100; this helps suppress loss of light, and helps enhance visibility for a user present in front of the image forming apparatus 100.

The embodiments disclosed herein should be understood to be in every respect illustrative and not restrictive. The scope of the present disclosure is not defined by the description of embodiments given above but by the appended claims, and encompasses any modifications made in the sense and scope equivalent to those of the claims.

For example, although the above embodiment deals with an image forming apparatus adopting electrophotography, this is not meant as any limitation; the present disclosure is applicable also in image forming apparatuses adopting any other image formation method such as an ink-jet method or a thermal transfer method.

Although the above embodiment deals with an example where the opposite parts 21b of the top cover member 21 are formed in rectangular, circular (or triangular), and other shapes, the opposite parts 21b may instead be formed into characters, symbols, or the like.

What is claimed is:

1. An operation panel for use in an image forming apparatus, comprising:
   a panel face including an operation region;
   a semi-transparent member of a black or similar color arranged such that a top face thereof is approximately flush with the panel face at least along a peripheral part thereof; and
   a light source arranged under the semi-transparent member in the peripheral part of the panel face;
   a side face extending downward from the peripheral part of the panel face; and
   a circuit board having the light source fitted at an end part thereof in a direction of a front face of the operation panel,
   wherein
   the semi-transparent member is formed to lie continuously over the panel face to the side face,
   a reflective member reflecting light from the light source in a predetermined direction is provided near the light source,
   the reflective member is arranged so as to enclose the light source from left and right directions and from a direction of a back of the operation panel, and
   the light emitted from the light source is emitted toward top and front faces of the operation panel.

2. The operation panel of claim 1, wherein
   the light source comprises a plurality of light sources,
   the semi-transparent member has a plurality of opposite parts on which the light sources are arranged opposite each other, and
   the opposite parts are formed in mutually different shapes and in addition with a thickness smaller than a thickness of another part of the semi-transparent member.

3. The operation panel of claim 2, wherein
   the opposite parts are given a thickness smaller than the thickness of the other part of the semi-transparent member as a result of an inner face of the semi-transparent member being formed in a recessed shape.

4. The operation panel of claim 1, wherein
   an outer face of the semi-transparent member is grained by a surface graining process.

5. An image forming apparatus, comprising:
   the operation panel of claim 1;
   an image forming section configured to form an image.

* * * * *